Inventor
WALTER D. ARCHEA
By HK Parsons
Attorney

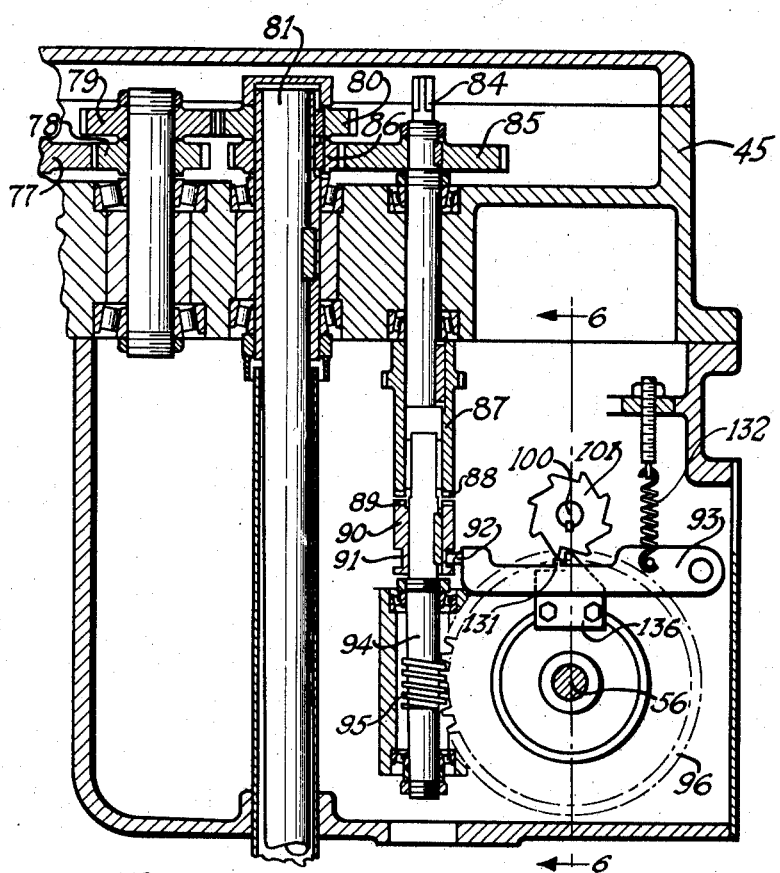

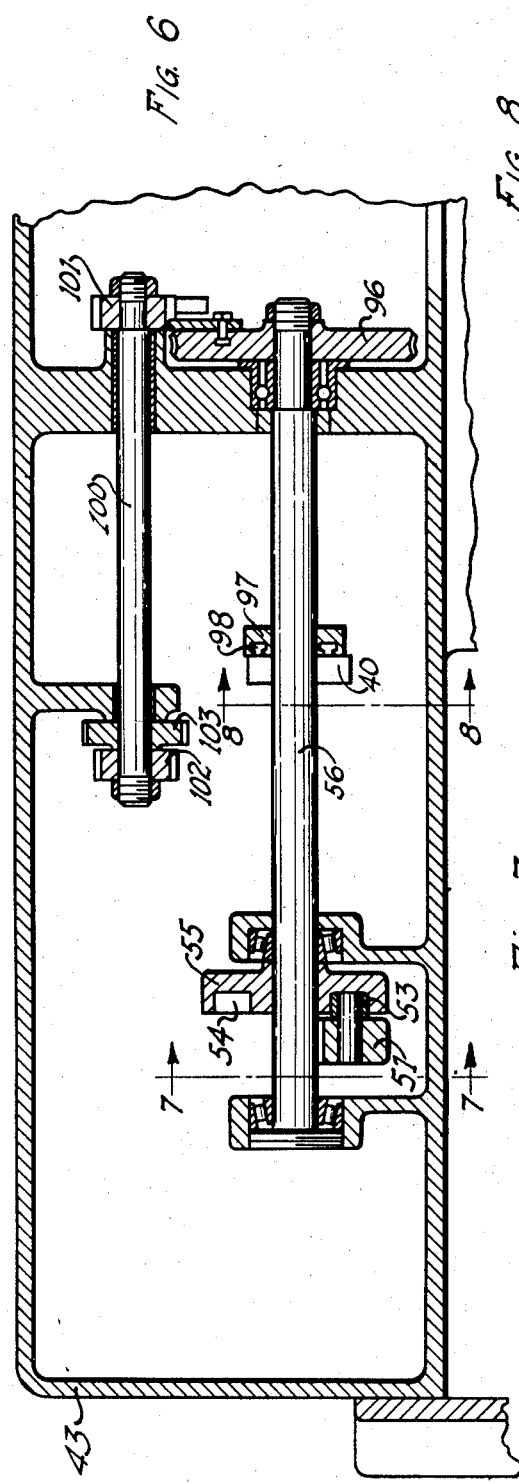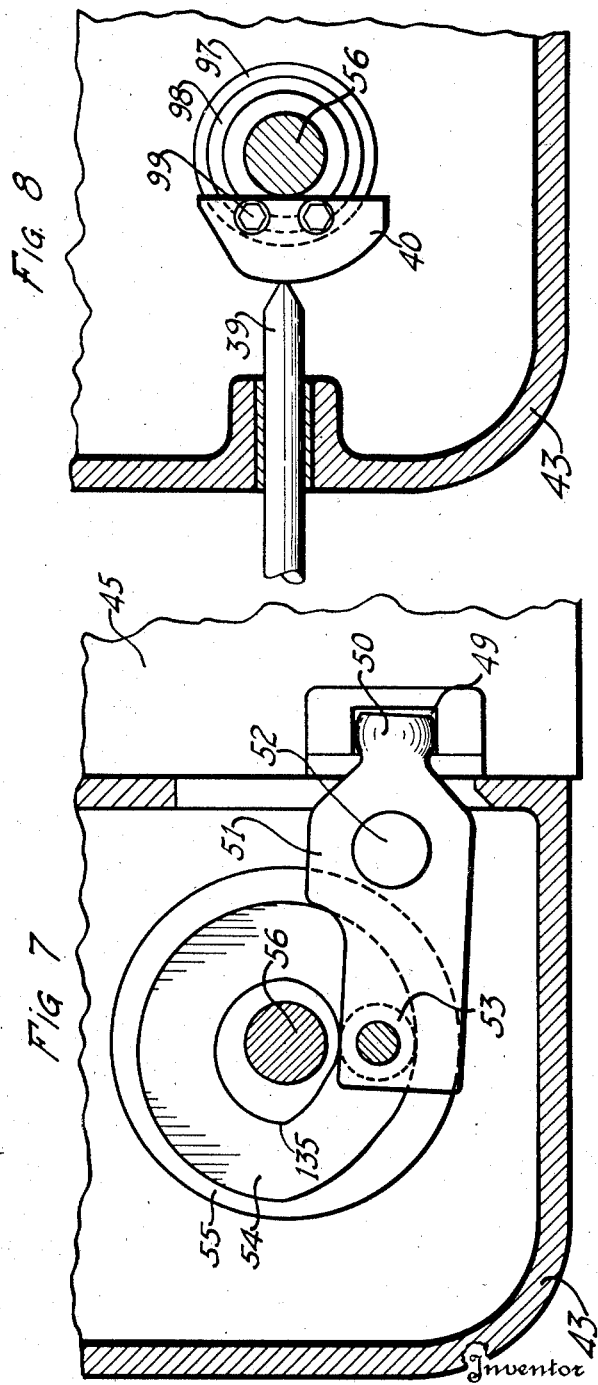

Patented June 5, 1934

1,961,123

UNITED STATES PATENT OFFICE 1,961,123

MILLING MACHINERY

Walter D. Archea, Cincinnati, Ohio, assignor to The Cincinnati Milling Machine Company, Cincinnati, Ohio, a corporation of Ohio Application February 28, 1929, Serial No. 343,393

22 Claims. (Cl. 90—19)

This invention relates to improvements in milling machines and has particular reference to machines for the removal of stock from a work piece in angularly related directions.

One of the principal objects of the present invention is the provision of an improved type of machine and which may be readily utilized for continuous operation on a work piece to produce a shape or contoured non-continuous milled surface thereon.

A further object of the present invention is the provision in connection with a machine capable of utilization as above, of a control mechanism for automatically effecting the several desired cyclic movements of the parts in predetermined recurrent sequence.

A further object of the invention is the provision of a machine of the reciprocating milling type in which predetermined relative movement of the cutter and work may be automatically effected at each end of the table stroke to produce a contoured surface of desired form on opposite work pieces whereby one work piece may be removed while the other is being shaped by the cutter and thus substantial continuous milling effected and idle time of the machine reduced to a minimum.

A further object of the invention is the provision in conjunction with a normal reciprocating milling machine table control mechanism of an auxiliary mechanism couplable therewith to retard functioning of the table reversing mechanism a predetermined amount whereby additional operations may be performed on the work piece prior to the reversal of movement thereof.

Other objects and advantages of the present invention should be readily apparent by reference to the following specification considered in conjunction with the accompanying drawings forming a part thereof and it will be understood that any modifications may be made in the specific details of construction and combination and arrangement of parts hereinafter described within the scope of the appended claims without departing from or exceeding the spirit of the invention.

Figure 4 is a vertical section through the upper portion of the main column member.

Figure 5 is a fragmentary semi-sectional view illustrating equalizer clamp mechanism for retaining the work pieces.

Figure 6 is a horizontal sectional view as on the line 6—6 of Figures 3 and 4.

Figure 7 is a fragmentary section on the line 7—7 of Figure 6.

Figure 8 is a section on line 8—8 of Figure 6.

Figure 1:
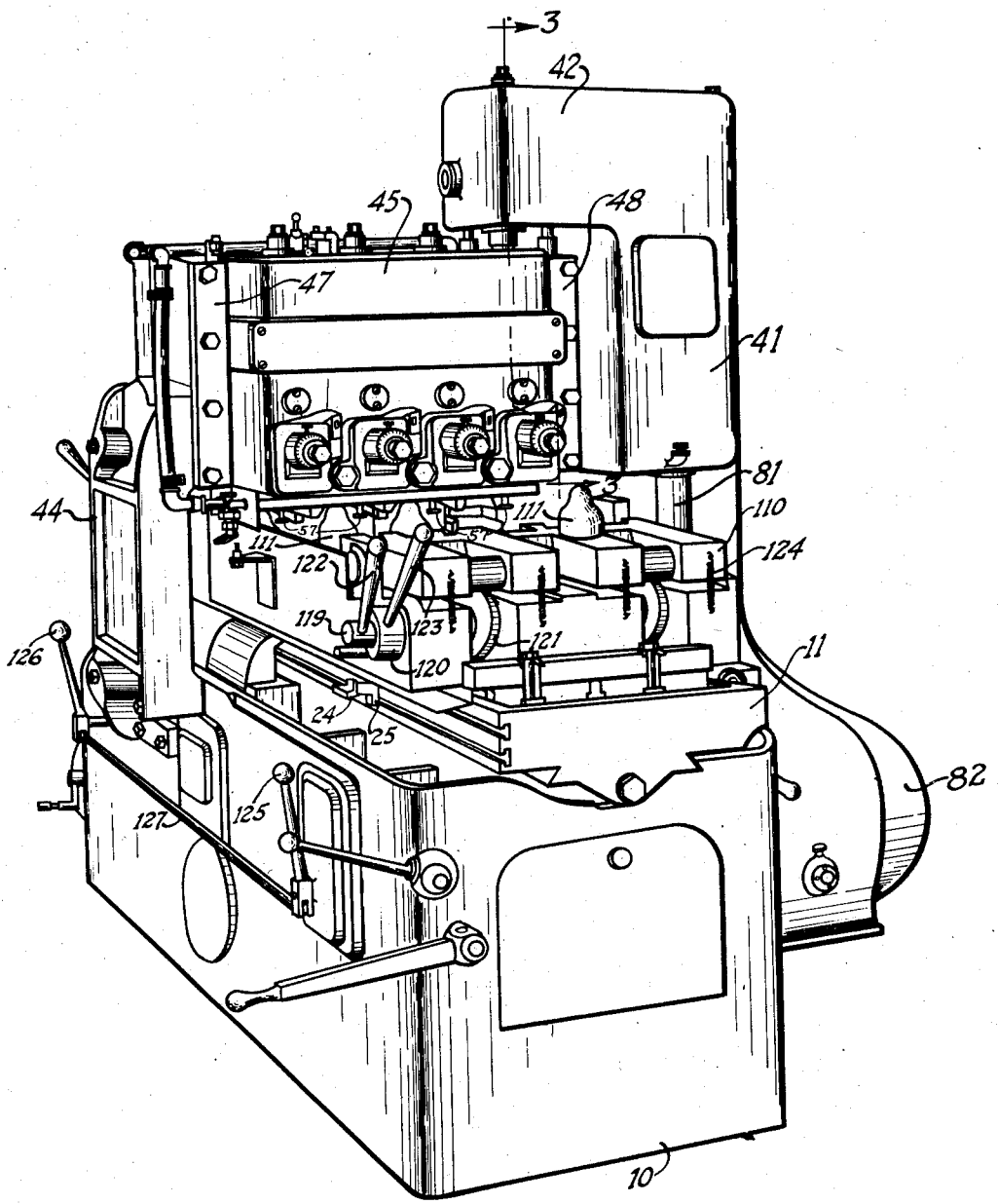
Figure 1 is a perspective view of a machine embodying the present improvements.

In the drawings the numeral 10 designates the elongated bed portion of a milling machine having slidably mounted thereon the table member 11. Said table member is adapted to be moved on the bed by suitable mechanism such as the piston 12 coupled with the table 11 by rod 13. This piston is actuable in cylinder 14 by hydraulic power introducable through lines 15 and 16 to opposite ends of the cylinder. The actuation of the table is controlled by a series of hydraulic valve mechanisms including a stop or short circuiting valve 17, a selector valve 18 and a pilot or actuating valve 19. The main or selector valve has leading thereto the feed pressure supply line 20 and rapid traverse supply line 21.

The selector valve is capable of reciprocating or longitudinal movement for reversing the connection between its ports 15' and 16' leading to lines 15 and 16 respectively so that the desired actuating fluid for feed or rapid traverse may be admitted to either end of the cylinder, and the opposite end coupled with discharge line 22. In addition the selector valve is rotatable to selectively couple the inlet side of the valve with the feed line 20 or rapid traverse line 21 as may be preferred. It being desirable that these several couplings be automatically effected and controlled, use is made of the pilot or control valve 19 having a trip portion 23 designed to be operatively shifted into different effective positions as by dogs 24 and 25 on the table.

The pilot valve has coupled therewith the pressure or hydraulic inlet line 26 which may be shunted or directed by movement of the trip 23 through line 27 or 28 to actuate the selector valve rotor located at 29 thereby changing the actuation of the table from quick traverse to feed or the reverse. In addition, the pilot valve is selectively actuable as indicated to couple the pressure line with either conduit line 30 or 31, the other line in either event being coupled with the exhaust.

Figure 2:
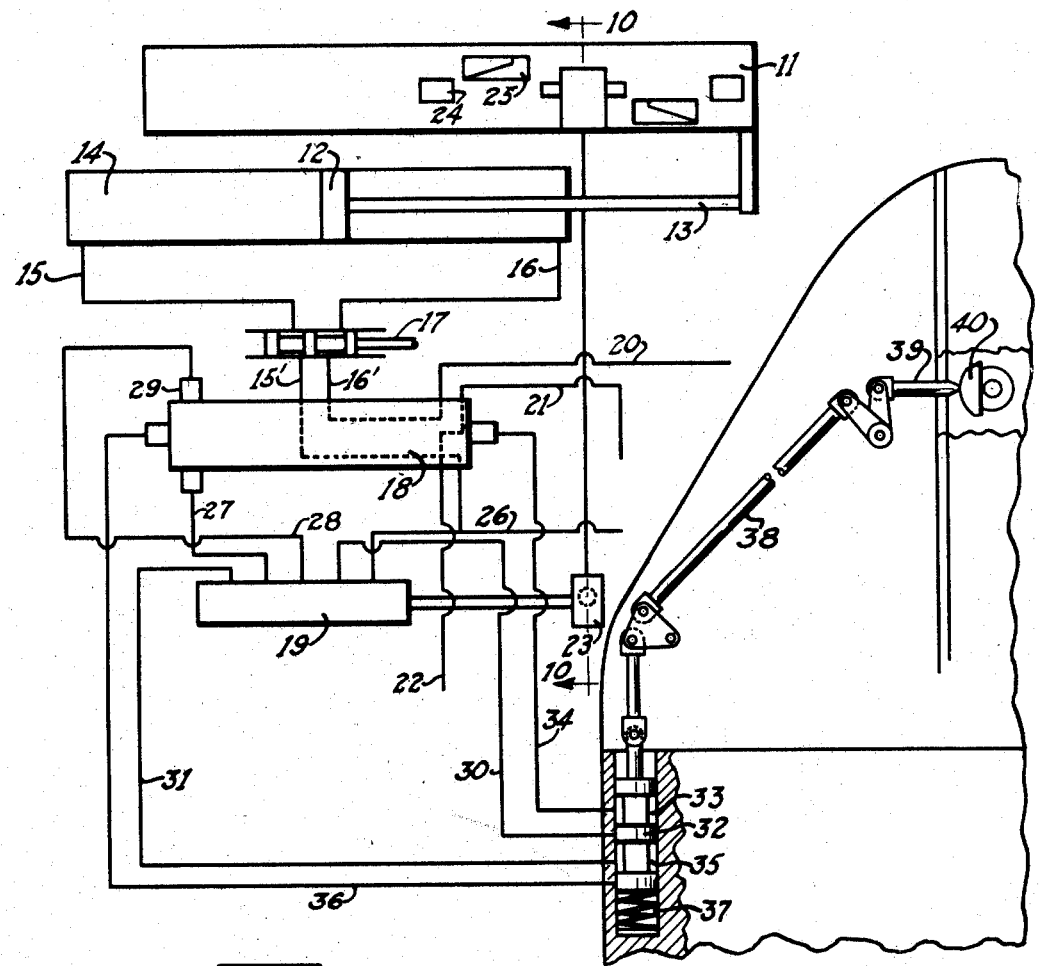
Figure 2 is a fragmentary front view of the machine with the actuating and control mechanisms for the table portion of the device diagrammatically illustrated.
Figure 10:
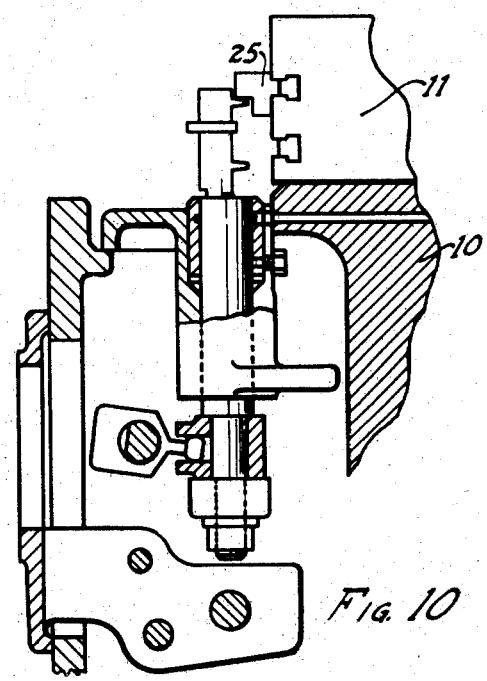
Figure 10 is a vertical section on line 10—10 of Figure 2 showing the mechanical details of the dog control trip member.

These lines extend to the supplemental actuation control valve located as at 32 and having the channel 33 adapted to afford communication between line 30 and actuation line 34 for the right hand end of the selector valve and a second channel portion 35 for coupling line 31 with the actuation line 36 for the left hand end of the selector valve. A spring 37 normally holds its control valve member in the closed position indicated in Figure 2 whereby flow from the pilot valve to either end of the selector valve is prevented. Linkage 38 couples the control valve with plunger 39 actuable by cam 40 as hereinafter described to temporarily shift control valve permitting flow of actuating medium from the pilot valve to the termini of the selector valve whereby the selector valve is pressure actuated for reversal in accordance with the setting of the pilot valve and at a time in the cycle of operation of the machine determined by the movement of cam 40. It will be understood that the position of the pilot valve is controlled by the dog members such as 24 and 25 on the table serving to shift the pilot valve to effect changes from feed to quick traverse or quick traverse to feed unaffected by the presence of the control valve and that in addition the dogs shift the pilot valve for a coupling of the actuating pressure with the selector valve shifters for reversal of the selector valve and thus of the movement of the table but that the flow of actuating medium having such reversal is governed by the position of the control valve with the result that while the parts are set for actuation no reversing movement takes place until plunger 39 is actuated by cam 40.

It is further to be understood that the actual table movement control is effected through the selector valve which could be directly actuated but on account of the pressure of the fluids normally passing there-through and to secure more instant dog controlled actuation thereof it is preferable that the pilot valve be utilized serving not for transmission or change of direction of flow of the table actuating medium there-through but merely as a structure of an actuating pressure which will serve subsequent to the shifting of the pilot valve to positively and with suitable pressure actuate the selector valve itself.

Rising from the rear of the bed 10 is the column member 41 having an over-hanging head as at 42 and a forwardly extending casing supported at the front by a bracket member 44 suitably bolted to the bed 10. A spindle carrier unit 45 is slidably mounted on the face 46 of the casing 43 and retained in position as by gibs 47 and 48. This carrier is formed with one or more sockets in its rear face. Socket 49 receives the rounded head 50 of rock lever 51 journaled on trunnion 52 in casing 43 and having an inwardly extending portion provided with a roller 53 disposed in groove 54 of face cam 55 which is secured on shaft 56. On rotation of shaft 56 the face cam will impart an up and down movement to roller 53 and consequently a corresponding movement to the inner end of the rock lever. This motion is transmitted through head 50 to carrier 45, causing a vertical sliding movement of the carrier on the face of casing 43.

Figure 3:
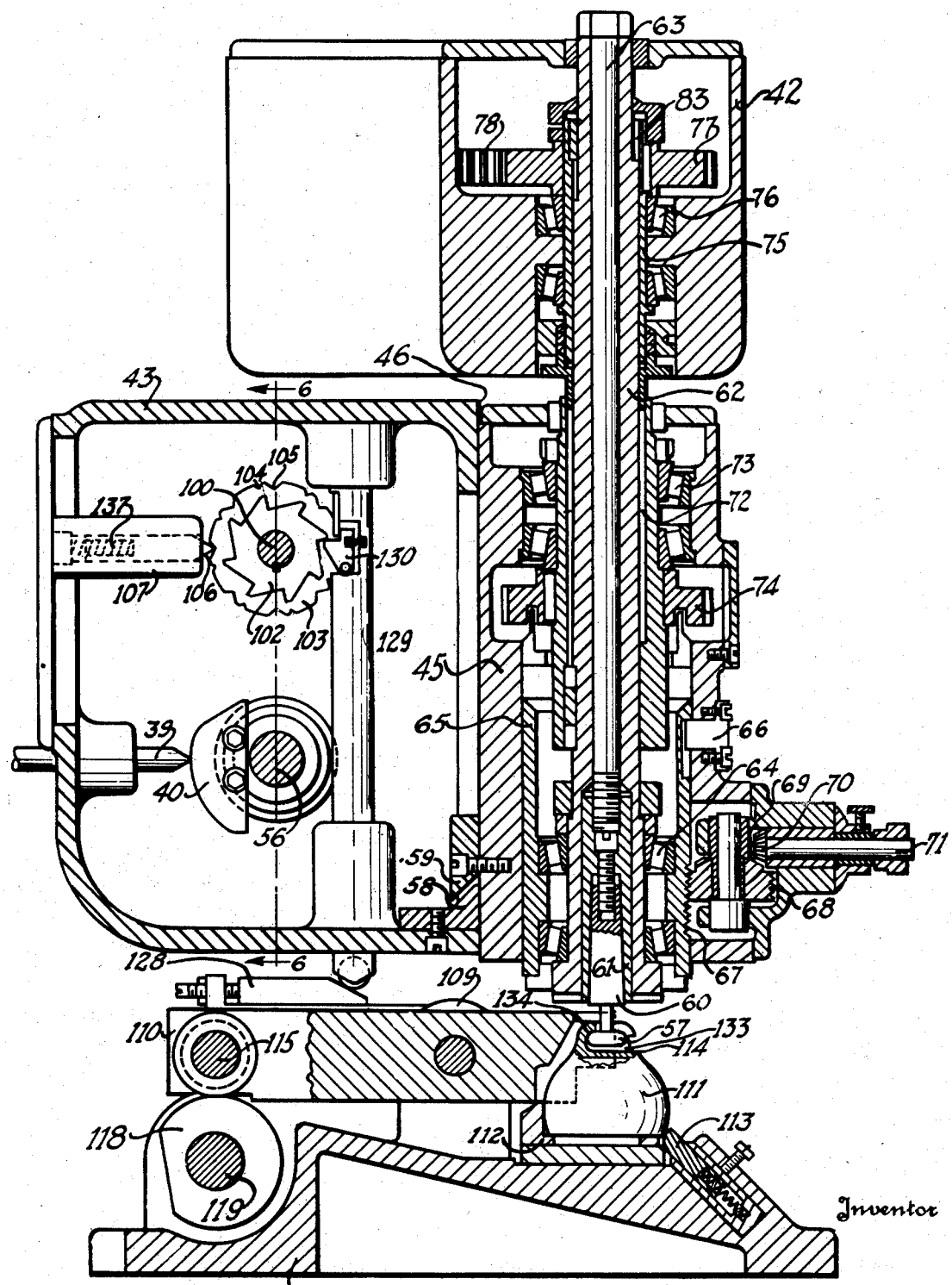
Figure 3 is a vertical sectional view through the work head taken as on line 3—3 of Figure 1.

In order that the carrier may be most securely locked in position to the casing when a work piece is being pressed against one of the cutters 57 of the spindle carrier, as indicated in Figure 3 for example, the casing is provided with a reversely inclined wedge block 58, while the carrier itself has an undercut bevelled plate 59 so positioned that as the carrier moves the members 58 and 59 will inter-lock wedging and securing the lower portion of the carrier in tight engagement with the face of the casing. This eliminates any possible play between the parts when in this operative position and allows of such fitting of the gibs 47 and 48 as will permit of the vertical sliding movement of the carrier without undue binding friction.

In order that maximum production of work pieces per hour may be accomplished, the spindle carrier is preferably provided with a plurality of milling cutters 57 for operation upon juxta-positioned work pieces. This has been indicated in Figure 1 of the drawings in which the several spindle structures are substantially identical, each one having been shown in detail in section.

The general structure of this part is clearly illustrated in Figure 3 from which it will be noted that the cutter 57 has a shank 60 fitting in the collet 61 secured in the lower end of the tubular spindle 62 by the drawing rod 63. The spindle is journaled at its lower end by anti-friction bearings 64 in the vertically adjustable, non-rotatable sleeve 65 held against rotation by key 66. This sleeve has a worm rack portion as at 67 meshing with worm 68 rotatable through bevel gear portion 69, and meshing pinion 70 on adjusting shaft 71 whereby fine micrometer adjustment may be given for proper vertical positioning of cutter 57. Spindle 62 has sliding splined connection in the upper portion of carrier 45 with sleeve 72 journaled in anti-friction bearings 73 and having exteriorly secured thereon the drive gear 74. The several adjacent spindles are each provided with gears corresponding to gear 74 and in mesh, one with the other, for transmission of power whereby the various cutters are simultaneously power operated for proper milling of their respective work pieces.

While the three left hand spindles shown in Figure 1 terminate at the top of the carrier the spindle shown in section in Figure 3, being the transmitter of drive head 42, extends upward above the carrier and is slidable within sleeve 75, rotatably held against vertical movement by suitable anti-friction bearings 76. Sleeve 75 has exteriorly keyed thereon a drive gear 77 meshing with gear 78 of the couplet 78 and 79 which latter is in constant driving mesh with gear 80 on the vertical power shaft 81 suitably driven from prime mover 82, a suitable key or splined connection as at 83 between the spindle 62 and driven sleeve 75 connects these parts for joint rotation while permitting vertical adjustment of the spindle with the spindle carrier or relative to the spindle carrier.

In addition to providing power for operation of the several cutters, shaft 81 supplies the necessary power for vertical reciprocation of the cutter carrier and automatic control of the cycle of operation of the machine. This is primarily effected through shaft 84 in the column having a gear 85 meshing with a second gear 86 on shaft 81. The shaft 84 extends downwardly in the column through suitable anti-friction bearing supports and has keyed thereon the sleeve 87 having clutch teeth 88 engageable with teeth 89 of the slidable clutch member 90 having a peripheral groove 91 for engagement with shifter yoke 92 at one end of lever 93. This clutch sleeve is keyed for sliding movement on shaft 94 having worm 95 operatively engaging worm gear 96 on transverse shaft 56 having one end disposed within the column proper of the machine and its main portion extending into casing 43. This shaft, as has been previously mentioned, is provided with the cam 55 controlling the vertical movement of the spindle carrier and also with the disc 97 having a T slot 98 in its face adjustably supporting actuating cam 40 for plunger 39. Variation of the relationship of cam 40 to the disc accomplishable by loosening of the T bolts 99 serves to vary the effective point of reversal of the machine table.

Inasmuch as it is desired to impart but a single up and down stroke to the spindle carrier for operation on an individual series or loading of work pieces it has been found desirable to make use of a suitable mechanism for automatically controlling the rotation of shaft 56 and its actuating cam. This mechanism includes shaft 100 bearing at one end immediately adjacent worm gear 96 the star wheel or ratchet 101 and near its opposite end having a second star wheel or ratchet 102 and an adjacent notched control disc 103. This latter disc is provided with a plurality of pairs of notches 104 and 105 respectively corresponding in number to the number of teeth on members 101 and 103. A spring pressed load and fire plunger 106 carried by bracket 107 on the casing 43 serves to hold shaft 100 against accidental movement or alternatively to accentuate movement of the shaft and consequently of the mechanisms controlled thereby as it rides down a notched wall.

Carried by the table member 11 are the work holding fixtures which are similar but oppositely disposed at opposite ends of the table. These fixtures in the present instance comprise the base portion 108 having upstanding ears 109 to which are intermittently pivoted the clamp 110 for urging the work pieces 111 against the seats 112 and the opposed resilient positioning members 113. The clamps are preferably bifurcated in form to span the reduced neck portion 114 of the work. To facilitate proper clamping they are connected in pairs as by the bar 115 swiveled at 116 and 117 respectively to an adjacent pair of clamp arms. Centrally this bar rests on the clamp cam 118 carried by a shaft or spindle 119. In the form indicated spindle 119 is journaled in part in the base block 108 and in part in the sleeve 120 carrying the second clamp controlling cam 121. This construction enables the clamping of four articles to be substantially, individually performed through actuation of the pair of adjacent control levers 122 and 123 for the rod and sleeve respectively. An individual spring 124 serves to actuate the clamp levers in a reverse direction disengaging the work piece.

In order that the machine may be utilized for reciprocating milling or a cutting operation as the table moves in either direction and may at the same time be properly controlled, use is made of a pair of control levers 125 and 126 inter-connected by a link 127.

Figure 9:
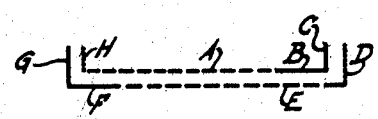
Figure 9 is a diagram of one cycle of operation of the machine.

In the operation of the machine the table is ordinarily moved to its limit of stroke in one direction. A series of work pieces are then positioned in the clamps at the free end of the table and movement of the table initiated by shifting of the handle 125. This causes a rapid movement of the table toward the left until dog 24 actuates trip 23 slowing down from the rapid traverse portion of the cycle indicated diagrammatically in Figure 9 at "A" to a feed movement as indicated at "B". The work is now moving into the cutter 57, the spindle carrier being in its normal lowered position. This movement continues until the table has reached its limit of stroke to the left. During this movement dog 25 has shifted pilot valve 19 to a position which would cause a reverse actuation of the selector valve. This reversal however, is prevented by the fact that the hydraulic selector valve operating circuit is interrupted at the control valve 32. As the table approaches this limit of movement the adjustable cam or wedge block 128 forces plunger 129 upward. In this movement spring pressed pawl 130 engages a projecting tooth on ratchet 102 initiating rotation of shaft 100 which is accentuated by the action of plunger 106, the parts being then in the general relationship indicated in Figure 3. As the shaft so rotates the tooth of ratchet 101 which was previously in engagement with lug 131 on clutch shaft lever 93 moves past the lug, releasing the lever. Under the influence of spring 132 the lever is then shifted upwardly causing clutch teeth 88 and 89 to mesh and worm 95 to rotate worm gear 96. The rotation of the worm gear causing a clockwise movement of cam 55 gradually depresses the roller 53, raising carrier 45 and its associated spindles at a feed rate as is indicated at "C" on the diagram. This causes the milling cutters which have previously formed an inwardly extending slot as at 133 in the work piece to move centrally or axially upward in the neck of the work piece causing an under-cut recess as at 134 in continuation of the original transverse slot or cut at 133, this movement continues until the cam has made about ¾ revolution when the roller will be resting on the high point 135 thereof. The continued movement of the cam at the same constant worm driven rate will cause a rapid lifting of roller 53 and consequent depression or withdrawal of the cutter as respects the work, this being the rapid traverse return stroke of the spindle carrier indicated in the diagram at "D".

During this portion of movement of worm 96 adjustable dog 136 thereon in contact with the next succeeding tooth on ratchet 101 imparts partial rotation to shaft 100 and carrying the plain un-notched portion of disc 103 past plunger 106. This movement continues until the plunger rides over the edge of notch 104 when the expansion of its spring 137, forcing the wedge-like end of the plunger against the wall of the notch, a load and fire mechanism positively continuing the rotation of ratchet 101 until it assumes the position shown in Figure 4.

In this movement, the lower-most tooth being actuated contacts with lug 131 depressing lever 93 and its shift yoke 92 and disengaging the clutch 88—89 when the rotation of the worm and consequently the movement of the head will be stopped until the parts are again set in operation by the lifting of plunger 129. Mention has been made of the fact that shaft 56 is provided with a disc 97 carrying a cam member 40. This cam is so adjusted as to be brought in engagement with plunger 39 as the carrier is reaching its lowermost position, but prior to dis-continuing of the drive of shaft 56. Actuation of the plunger serves through linkage 38 to shift valve 32 from the position shown in Figure 2 to a position coupling the lines 30 to 34 and conduits 31 to 36.

This permits actuating fluid to flow in accordance with the dog determined position of the pilot valve to one end or the other of the casing for the selector valve whereby the selector valve is then hydraulically shifted to reverse the movement of the table. The dog controlled action is such that the line 27—28 has already been effective to rotatably adjust the selector valve changing its setting from a feed to a rapid traverse.

Immediately therefore, upon the shifting of valve 32 the selector valve will be shifted to cause a reverse rapid traverse as is indicated at "E" on the diagram causing the table to be moved or reciprocated in the opposite direction from that in which the cutting feed was just being utilized. Movement of the table will continue in this opposite direction until suitable dogs thereon shift the pilot valve and cause movement of the selector valve from a rapid traverse to a feed coupling when the table will feed as is indicated at "F" for the formation of base of slot for a work piece at the opposite end of the table.

As the table reaches its limit of movement in this direction a second similar cam member 128 at the opposite end of the table will become operative to again lift plunger 129 causing release of the lock-out for clutch 90 and a second vertical stroke of the carrier and its associate parts will be initiated at a feed rate as indicated at "G" followed by a quick return to lower-most position as at "H".

By provision of work holding fixtures at the opposite ends of the table, said reciprocating milling may then be continuously, automatically performed. Work pieces are loaded at one end of the table while being cut at the opposite end and the table rapidly shifted from one position to the other so that the same series of horizontally disposed cutters rotated about vertical axes will alternatively engage work pieces supported on opposite ends of the table cutting first at the one side and then at the other and complete cyclic operation being completed through the utilization of spaced control members such as the table dogs and actuating cams 128 operating on the common control mechanism for alternate table and carrier actuating movement.

It will be noted that while cam bar 59 permits of ready vertical movement of the carrier, its inter-lock with member 58 on the carrier is such as to firmly retain the lower end of the carrier in position, particularly when the direction of table movement for the cutting is toward the right as indicated in Figure 3.

I claim:

1. A machine tool including a bed or support, a work supporting member translatably mounted thereon, a tool supporting member carried thereby, a cutter mounted in the carrier in position for operation on work supported by the table during translatory movement of the table, means for automatically imparting relative shifting movement to the work and cutter in two paths normal, one to the other at a slow feeding rate for stock removal from the work in angularly related direction, including independent power actuated means for effecting the relative movement in each path, control mechanism for said power actuated means to maintan continuity of operation from one path to the other, and means for reversely, relatively shifting the parts in the two paths aforesaid at a rapid traverse rate whereby the tool and work are quickly withdrawn from engagement one with the other.

2. A machine of the character described including a bed or support, a table translatably mounted thereon, a spindle carrier overlying the table, means supporting the spindle carrier for sliding movement toward and from the table, and automatic wedge mechanism for securing the carrier against lateral movement comprising cooperative members carried respectively by the carrier and supports and inter-engageable as the carrier is moved toward the table.

3. A machine of the character described including a bed, or support, a table translatably mounted thereon, a spindle carrier overlying the table, means supporting the spindle carrier for sliding movement toward and from the table, automatic wedge mechanism for securing the carrier against lateral movement comprising cooperative members carried respectively by the carrier and supports and inter-engageable as the carrier is moved toward the table and means for imparting a feeding movement to the carrier as respects the table in one direction and a quick traverse movement of the carrier relative the table in the opposite direction.

4. A machine tool of the character described including a bed or support, a work supporting table translatably mounted thereon, a column member rising adjacent the table, a guide supported by the column in position overlying the table, a spindle carrier supported by the guide for movement in a direction toward and from the table, means for selectively imparting fast and slow translating movement to the table, means for imparting movement of the carrier toward and from the table, trip actuated control devices for initiating operation of the second means after a predetermined movement of the table and valve mechanism actuated by the return of the carrier to effect return of the table.

5. A machine of the nature described including a bed, or support, a work table mounted thereon for translation relative thereto, a column rising therefrom, a guide casing supported by the column in position overlying the path of translation of the table, a spindle carrier slidably mounted on the casing, power actuable means within the casing for imparting movement to the spindle carrier, table actuated means for initiating actuation of said power carrier shifting mechanism on movement of the table in a predetermined relation to the carrier and additional self-contained automatic mechanism for discontinuing the power shifting of the carrier.

6. A machine of the nature described including a bed or support, a work table mounted thereon for translation relative thereto, a column rising therefrom, a guide casing supported by the column in position overlying the path of translation of the table, a spindle carrier slidably mounted on the casing, power actuable means within the casing for imparting movement to the spindle carrier, table actuating means for initiating actuation of said power carrier shifting mechanism on movement of the table in a predetermined relation to the carrier, additional self contained automatic mechanism for discontinuing the power shifting of the carrier and means coupled with the carrier shifting mechanism for automatically effecting actuation of the table at a predetermined point in the cycle of actuation of the carrier.

7. A machine tool of the character described, the combination with a bed or support, with a table mounted thereon for translation relative thereto, a carrier overlying the path of translation of the table, a cutter spindle journaled in the carrier, hydraulic means for translating the table, dog controlled means for determining the rate and direction of said translatory movement of the table, mechanical means for reciprocating the carrier relative to the table and trip instrumentalities for automatically controlling the movement of the carrier with respect to the table.

8. In a machine tool, the combination with a bed or support, of a table mounted thereon for translation relative thereto, an hydraulic system for effecting such relative translation including a piston coupled with one of the parts and a cylinder therefor coupled with the opposite part, an hydraulic supply system for introducing actuating fluid selectively into either end of the cylinder including a selector valve for determining the direction of actuation of the piston, a pilot valve controlling the hydraulic actuation of the selector valve, an interrupter valve having a normal position preventing flow of the valve actuating medium to the selector valve, means for automatically opening the interrupter valve whereby the selector valve will be shifted in a manner determined by the existing position of the pilot valve, a trip control associated with the pilot valve and dogs carried by and movable with the table for automatically actuating the pilot valve trip on movement of the table whereby pilot valve will be set for the desired succeeding movement of the table at a time determined by the actuation of the interrupter valve, a spindle carrier movable on the support in a direction toward and from the table and connections between the interrupter valve and spindle carrier for actuation of the said valve in predetermined relation to the actuation of the carrier.

9. A machine tool of the character described including a translatable work support, a tool support translatable in a path at an angle to the path of movement of the work support, hydraulic means for translating the work support, a setting valve positionable by movement of the work support to determine the ensuing movement to be imparted to said support, power actuated means for translating the tool support and an hydraulic actuation control device coupled with said power means for initiating actuation of the work support as determined by the setting member on completion of the movement of the tool support.

10. A machine tool of the nature described including a tool support and a work support, means for translating the work support, means for imparting movement to the tool support in a direction toward and from the work support, said means including a cam, a single revolution clutch mechanism for controlling the actuation of the cam, a table actuation control member, and means movable with the cam for operation of the control member whereby the table will be automatically actuated in pre-determined relation with respect to the cam controlled tool actuation.

11. A machine tool combining work and cutter supports, power means for translating one of said supports, power means for translating the other of said supports including a rotatable shaft, a power drive couplable therewith, means operable by movement of the first support for coupling the power drive to the second support, means operable by the shaft for disconnecting the power drive at a predetermined point in the rotation of the shaft and additional means operable on rotation of the shaft for varying the operative association of the first mentioned support and the drive therefor.

12. A machine tool of the nature described including a translatable work support and a translatable spindle support, power means for translating the work support, means for translating the spindle support including a shaft, a source of power therefor, a clutch for coupling the shaft and source of power, a spindle support oscillating cam carried by the shaft, a clutch throw-out carried by the shaft for discontinuing actuation thereof and a work support actuation control member carried by the shaft for effecting actuation of the work support in predetermined cycle as respects the cam actuation of the tool support.

13. A machine tool structure including a support having guide ways thereon, a supplemental support member slidable on the ways, and means for locking the supplemental support against tilting on the ways including a pair of oppositely beveled members shiftable into inter-locking engagement on movement of the supplemental support in one direction substantially as illustrated.

14. A machine tool structure including a support, a spindle carrier translatably mounted on the support, a sleeve slidably but non-rotatably secured within the carrier and having an interior rack portion, a worm journaled in the carrier and meshing with the rack said worm having a bevel gear portion, a pinion meshing with said bevel gear portion, means for rotating the pinion to adjust the position of the sleeve, a spindle rotatably secured within the sleeve against longitudinal movement with respect thereto, a second sleeve rotatably journaled in the carrier, means retaining said second sleeve against longitudinal movement, means coupling said sleeve for rotation with the spindle, and an adjacent spindle drive gear carried by the sleeve whereby the sleeve rotatably supports the spindle and serves to transmit drive to an adjacent spindle without lateral strain on the contained spindle.

15. In a machine tool the combination of an hydraulically reciprocated support, a source of pressure, a shiftable valve for coupling the pressure to the support in such manner as to determine the direction of movement thereof, a power rotated shaft, power operable mechanical mechanism for determining shifting of said valve, clutch devices for coupling the mechanism to said shaft for power actuation thereby and trip means actuated by the support at a predetermined point in its travel for shifting said clutch mechanism to cause power shifting of the reverse valve.

16. A machine tool having a support capable of being advanced and retracted, a second support movable toward and from the first support, independent power actuated means for reciprocating the second support, a source of power therefor, a clutch for coupling the power to said power actuated means, trip actuated means for shifting said clutch, and means carried by the first support and operable after an advancing and retracting movement thereof to actuate said trip means to effect movement of the second support toward and from the first support.

17. In a machine tool, the combination with a bed or support, of a table mounted thereon for translation relative thereto, an hydraulic system for effecting such relative translation including a piston coupled with one of the parts and a cylinder therefor coupled with the opposite part, an hydraulic supply system for introducing actuating fluid selectively into either end of the cylinder including a selector valve for determining the direction of actuation of the piston, a pilot valve controlling the hydraulic actuation of the selector valve and an interrupter valve having a normal position preventing flow of the valve actuating medium to the selector valve, mechanically actuated timing mechanism connected to the interrupter valve, and means operable by the table for effecting operation of said mechanism and thereby shifting of the interrupter valve at a predetermined subsequent time in accordance with the setting of said timing mechanism.

18. A machine tool having an hydraulically reciprocated support, hydraulic circuit connections therefor including a shiftable direction determining valve, a source of pressure coupled to the valve, means to couple the pressure to opposite ends of the valve to effect shifting thereof, an interrupter valve normally preventing a shifting flow to one end of the valve upon coupling thereof, a second slide movable toward and from the first slide, a source of power, a one revolution mechanism selectively couplable to the source of power for effecting movement of the second slide to and from the first slide, and means operable by said mechanism upon completion of movement of the second slide to shift the interrupter valve and thereby effect continuation of the first slide movement.

19. In a milling machine the combination of a rotatable tool spindle, a support for said spindle, a work support adjacent said spindle, said supports being relatively movable in a first path transverse to the axis of said spindle for forward direction cutting movements and reverse direction idle movements, one of said supports being movable in a second path transverse to said first path to an advanced cutting position or alternatively to a retracted non-cutting position, a spindle transmission, a transmission for said relative movement in one of said paths driven from said spindle transmission and including a means operable to effect forward and reverse movements, a power train for causing relative movement in the other path including a fluid operable device oppositely movable to two positions respectively corresponding to different of said positions of said movable support, a power operated pump, channels connectible from said pump for operation of said device to each of said positions thereof, valve means associated with said channels and having two positions respectively for movement of said device to the different positions thereof, and means for operation of said valve means in accordance with said forward and reverse movement.

20. In a milling machine the combination of a rotatable tool spindle, a support for said spindle, a work support adjacent said spindle, said supports being relatively movable in a first path transverse to the axis of said spindle for forward direction cutting movements and reverse direction idle movements, one of said supports being movable in a second path transverse to said first path to an advanced cutting position or alternatively to a retracted non-cutting position, a spindle transmission, a transmission for said relative movement in one of said paths driven from said spindle transmission and including a reverser operable for said forward and reverse movements, a trip device connected for operation of said reverser, means carried by one of the parts for operating said trip device, a power operated pump, a fluid operable device connectible with said pump for movement of one of said supports in said second path alternately to different of said positions thereof, valve means controlling said alternate connection of said fluid operable device, and motion transmitting connections from said trip device to said valve means, whereby to position said valve means for effecting said cutting position of said movable support during said forward movement and vice versa.

21. A machine tool having a support, a first slide mounted on the support for carrying a work piece, a second slide mounted on the support for movement toward and from the first slide, a circular cutter rotatably mounted on the second slide, a spindle transmission for effecting rotation of the cutter, means for effecting relative movement between the cutter and work in right angular paths to form a plain surface along one path and a quasi-cylindrical surface along a second path including fluid actuable means for reciprocating the work slide transversely of the axis of the cutter, a mechanical transmission actuated by the spindle transmission for feeding the cutter tool along the second path whereby the periphery of the cutter will engage the work, means in the tool slide and operable by a trip carried by the work slide for simultaneously terminating movement of the work slide and initiating movement of the tool slide, and additional means carried by the tool slide for terminating its movement at the end of its cycle and simultaneously initiating return movement of the work slide.

22. A machine tool of the character described comprising a support, a work table mounted on the support for translation in a rectilinear path, a spindle carrier mounted on the support in spaced relation to the table for movement in a rectilinear path toward and from the table, hydraulically actuated means including a control valve for effecting translation of the table, mechanically actuated means including a clutch for shifting the carrier, means controlled by the table for simultaneously shifting said clutch to initiate movement of the carrier and shifting said valve to terminate table movement, and means on the carrier for automatically initiating movement of the table upon completion of carrier movement.

WALTER D. ARCHEA.